United States Patent
Wang et al.

(10) Patent No.: US 9,447,722 B2
(45) Date of Patent: *Sep. 20, 2016

(54) ELECTRIC ACTUATOR CURRENT CONTROL RESPONSIVE TO TEMPERATURE

(71) Applicant: Ford Global Technologies, LLC, Dearborn, MI (US)

(72) Inventors: Yan Wang, Ann Arbor, MI (US); Gregory Patrick McConville, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

This patent is subject to a terminal disclaimer.

(21) Appl. No.: 14/256,757

(22) Filed: Apr. 18, 2014

(65) Prior Publication Data

US 2015/0300276 A1   Oct. 22, 2015

(51) Int. Cl.
| | |
|---|---|
| F02D 23/00 | (2006.01) |
| F02B 37/16 | (2006.01) |
| F02B 37/18 | (2006.01) |
| F02D 41/00 | (2006.01) |
| F02D 41/20 | (2006.01) |

(52) U.S. Cl.
CPC ............. F02B 37/16 (2013.01); F02B 37/183 (2013.01); F02D 41/0007 (2013.01); F02D 2041/2048 (2013.01); F02D 2041/2065 (2013.01); F02D 2200/0406 (2013.01); F02D 2200/0414 (2013.01); F02D 2200/703 (2013.01); Y02T 10/144 (2013.01)

(58) Field of Classification Search
CPC ...... F02B 37/18; F02B 37/16; F02B 37/183; F02D 2041/2048; F02D 41/0007; F02D 2200/703; F02D 2200/0414; F02D 2200/0406; F02D 2041/2065; Y02T 10/144

USPC .......................................................... 60/602
See application file for complete search history.

(56) References Cited

U.S. PATENT DOCUMENTS

| | | |
|---|---|---|
| 5,333,948 A | 8/1994 | Austin et al. |
| 5,532,889 A | 7/1996 | Stefansky et al. |
| 7,006,911 B2 | 2/2006 | Wilhelm et al. |
| 7,046,496 B2 | 5/2006 | Hsin |
| 2006/0091872 A1 | 5/2006 | Matsuura |
| 2007/0253097 A1 | 11/2007 | Sun et al. |
| 2010/0170244 A1 | 7/2010 | Brooks et al. |
| 2012/0124993 A1 | 5/2012 | Kim |
| 2012/0138827 A1 | 6/2012 | Kim |
| 2013/0150984 A1 | 6/2013 | Nigro et al. |
| 2013/0175970 A1 | 7/2013 | Tazawa et al. |
| 2013/0287568 A1 | 10/2013 | Miranda |
| 2013/0312406 A1* | 11/2013 | Landsmann ................ 60/602 |

OTHER PUBLICATIONS

Wang, Yan et al., "Wastegate Actuator Gain Adjustment," U.S. Appl. No. 14/517,630, filed Oct. 17, 2014, 45 pages.

* cited by examiner

Primary Examiner — Thai Ba Trieu
Assistant Examiner — Brandon Lee
(74) Attorney, Agent, or Firm — Julia Voutyras; Alleman Hall McCoy Russell & Tuttle LLP

(57) ABSTRACT

Various methods for controlling current supply to a wastegate actuator based on temperature are thus provided. In one example, a method for operating a wastegate comprises limiting a boost amount in response to a current limit based on a temperature of a wastegate actuator. The temperature may be an environmental temperature proximate the wastegate actuator.

16 Claims, 6 Drawing Sheets

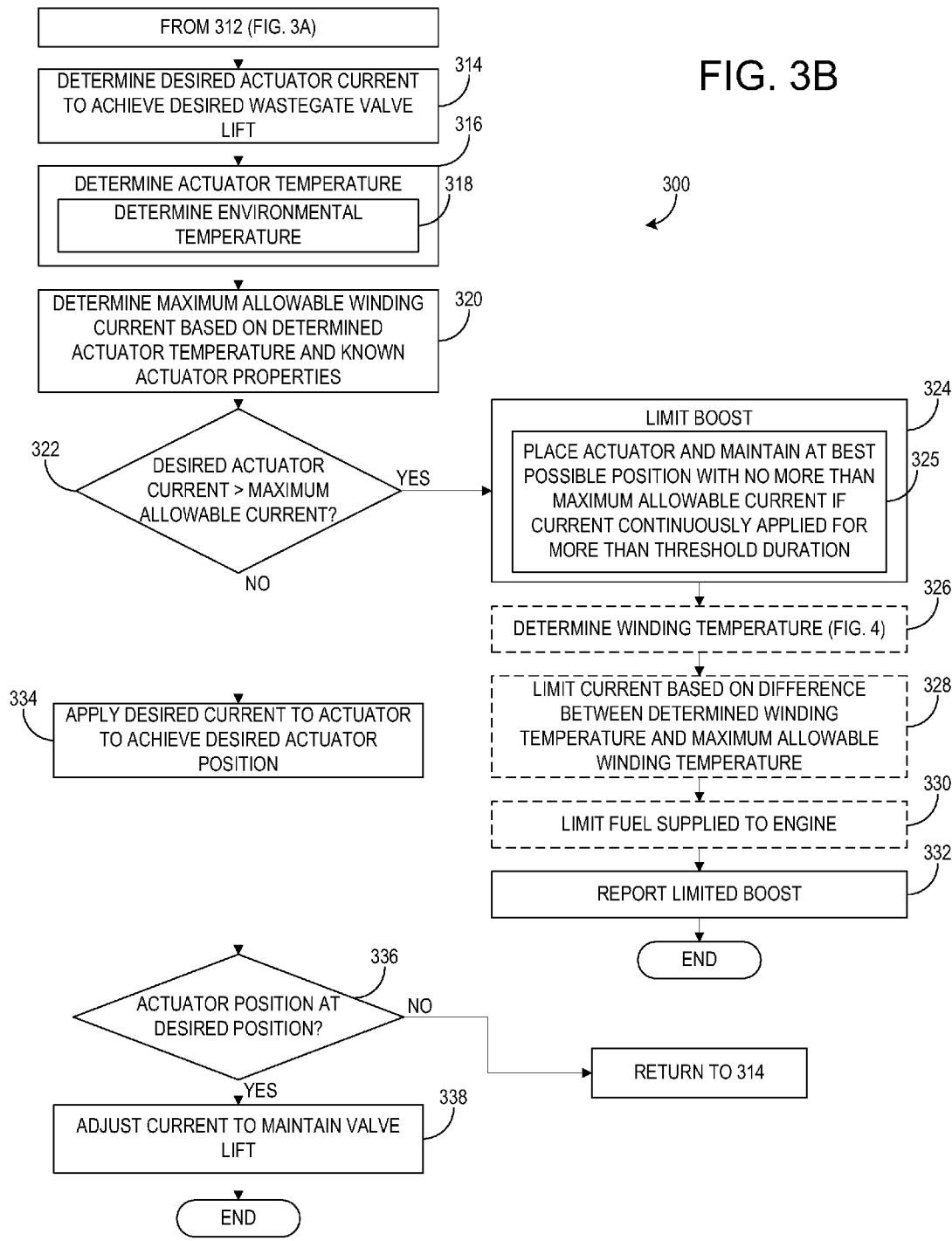

ELECTRIC ACTUATOR CURRENT CONTROL RESPONSIVE TO TEMPERATURE

FIELD

The field of the disclosure relates to control of a wastegate in a turbocharger.

BACKGROUND AND SUMMARY

Some internal combustion engines utilize a compression device such as a turbocharger to increase engine torque/power output density. In one example, a turbocharger may include a compressor and a turbine connected by a drive shaft, where the turbine is coupled to an exhaust manifold side of an engine and the compressor is coupled to an intake manifold side of the engine. In this way, the exhaust-driven turbine supplies energy to the compressor to increase the pressure (e.g. boost, or boost pressure) in the intake manifold and to increase the flow of air into the engine. The boost may be controlled by adjusting the amount of gas reaching the turbine, for example with a wastegate. An actuator may be operatively coupled via a linkage to a wastegate valve and driven to position the wastegate valve anywhere between a fully open position and a fully closed position (e.g., at a valve seat) to achieve the desired boost based on operating conditions. The actuator may be an electric actuator such as an electric motor, for example.

In some scenarios, the electric motor may be exposed to high surrounding temperatures due to proximate flow of exhaust gasses, and may exhibit high temperatures itself, for example due to the continuous reception of high electrical currents—e.g., during operating conditions in which high or maximum boost is consistently desired. As such, estimation of the electric motor temperature may be desired to avoid degraded motor operation and degradation of the motor itself.

U.S. Pat. App. No. 2013/0312406 describes a method for controlling an electric actuator for a wastegate valve arrangement of an exhaust gas turbocharger. In particular, a temperature of the electric actuator may be estimated from an engine voltage supplied to the actuator, a battery voltage, and its operating current based on a calculation model.

U.S. Pat. No. 7,006,911 describes a system for estimating the temperature of an electric actuator. In one example, the electric actuator temperature is estimated based in part on a resistance temperature coefficient which represents a motor winding resistance.

The inventors herein have recognized several issues with such approaches. First, estimates of the temperature of an electric motor based on voltage supplied to the motor and its operating current may be inaccurate and in some scenarios may result in underestimating the temperature, which could lead to degraded motor operation and thus degraded boost control. The accuracy of motor temperature estimation in such an approach may be further reduced as other contributions to motor temperature are not considered, such as the surrounding environmental temperature due in part to proximate exhaust gas flow. Second, actions taken to prevent motor degradation may exceed what is necessary to ensure normal motor operation, such as reducing the current supplied to the motor by an excessive amount or ceasing current supply altogether, which may significantly reduce boost below a desired boost level and adversely impact the experience of a vehicle operator. Alternatively, the reduction of current supplied to the motor may be insufficient to avoid degraded motor operation.

Methods for controlling current supply to a wastegate actuator based on temperature are thus provided.

In one example, a method for operating a wastegate comprises limiting a boost amount in response to a current limit based on a temperature of a wastegate actuator.

In a more specific example, limiting the boost amount includes placing the wastegate actuator at a best possible position by supplying at most current equal to the current limit to the wastegate actuator.

In another aspect of the example, the temperature is an ambient temperature proximate the wastegate actuator.

In yet another aspect of the example, the method further comprises limiting a fuel amount supplied to an engine.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3A & 3B show a flowchart illustrating a method for controlling a turbocharger associated with the wastegate arrangement of FIG. 2.

DETAILED DESCRIPTION

As described above, some internal combustion engines may use a compression device such as a turbocharger to increase the flow of air into the engine and thus increase torque/power output. The pressure delivered to the intake manifold, hereinafter referred to as "boost" or "boost pressure" may be controlled by adjusting the amount of gas reaching a turbine of the turbocharger, for example via a wastegate. An actuator, such as an electric actuator (e.g., electric motor) may be operatively coupled to a valve of the wastegate and driven to position the wastegate anywhere between a fully open position and a fully closed position to achieve the desired boost based on operating conditions.

In some scenarios, the electric actuator may be subject to high temperatures due to high proximate exhaust gas temperatures and the continuous application of electrical current, for example during conditions when maximum boost is consistently requested and the wastegate valve is maintained at a position with a high holding force. Accordingly, determining the temperature of the actuator may be desired to prevent degraded operation of the actuator and thus degraded boost control.

In the example that the electric actuator is an electric motor, the temperature of the motor may be estimated based on an estimated resistance taking into account the voltage supplied to the motor and the operating current of the motor. In other approaches, the temperature may be estimated based in part on an energy storage model that integrates the current supplied to the motor over time.

However, temperature estimation of the electric motor based on voltage supplied to the motor and its operating current may be inaccurate and in some scenarios may result in under-protection or over-protection of the actuator, which could lead to degraded motor operation and/or degraded boost control. For example, actions taken to prevent motor degradation may exceed what is necessary to ensure normal motor operation, such as reducing the current supplied to the motor by an excessive amount or ceasing current supply altogether, which may significantly reduce boost below a desired boost level and adversely impact the experience of a vehicle operator. Alternatively, the reduction of current supplied to the motor may be insufficient to avoid degraded motor operation.

Figure 1:
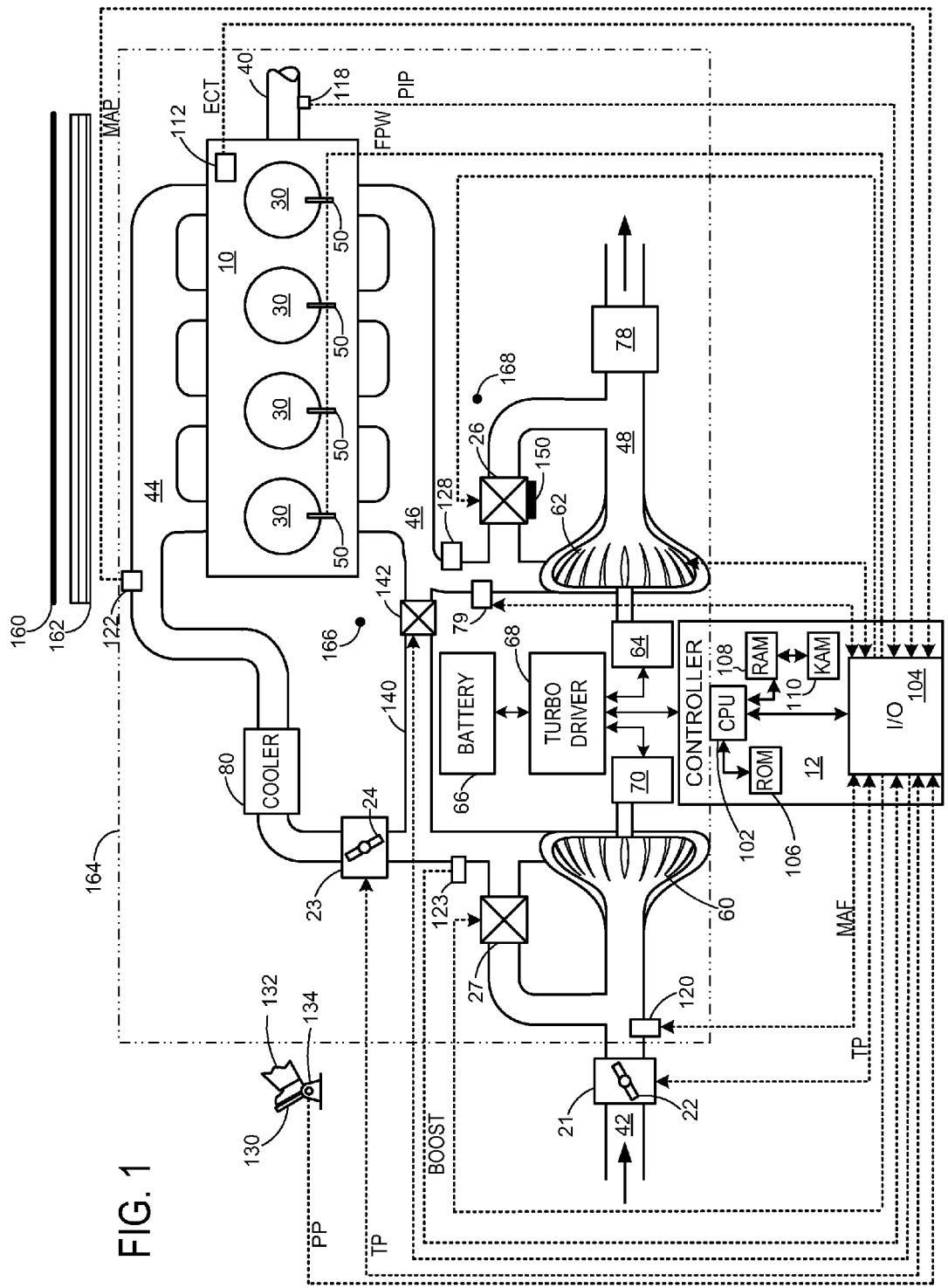
FIG. 1 shows a block diagram of a turbocharged engine including a wastegate.
Figure 2:
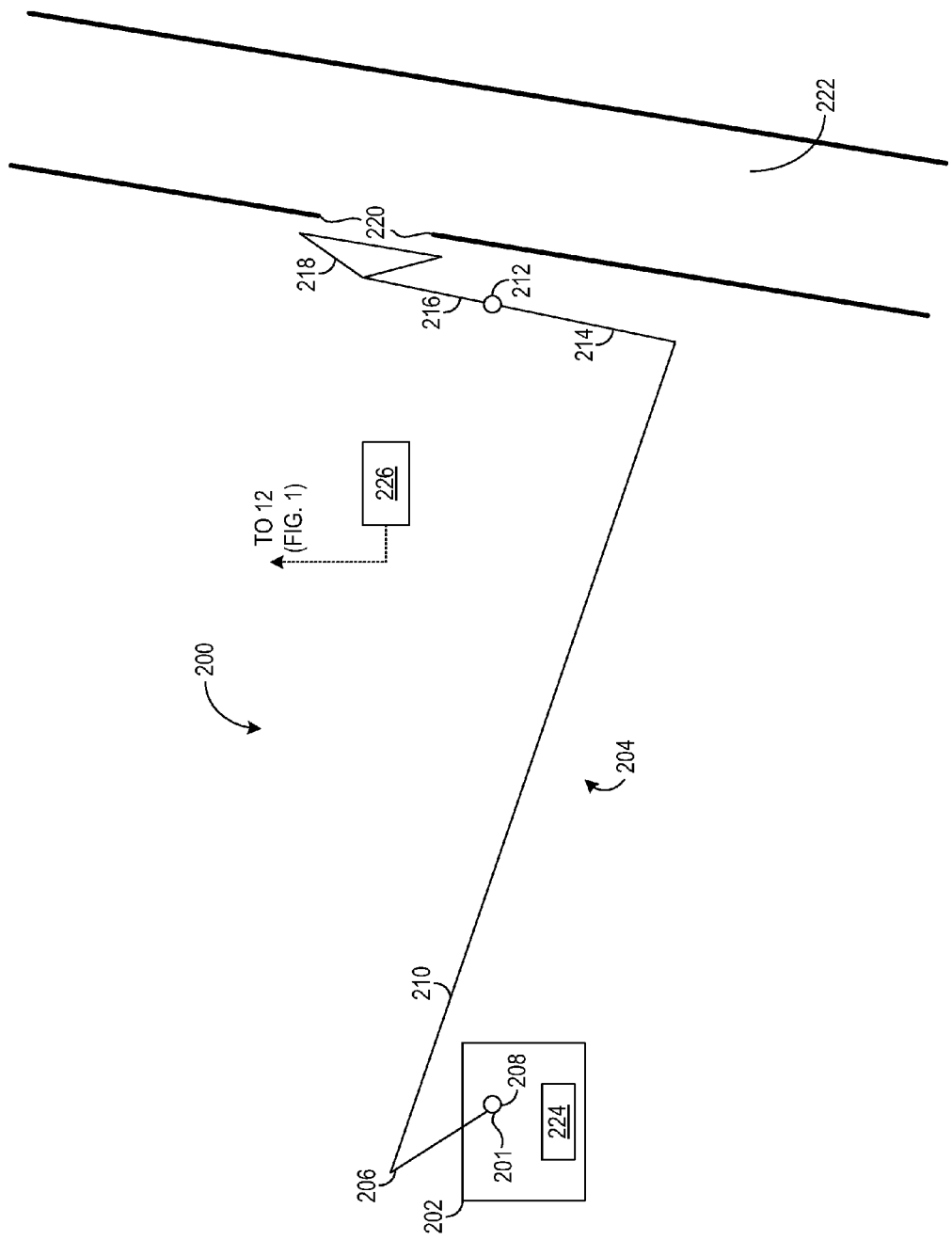
FIG. 2 shows an exemplary wastegate arrangement of the wastegate of FIG. 1.
Figure 3A:
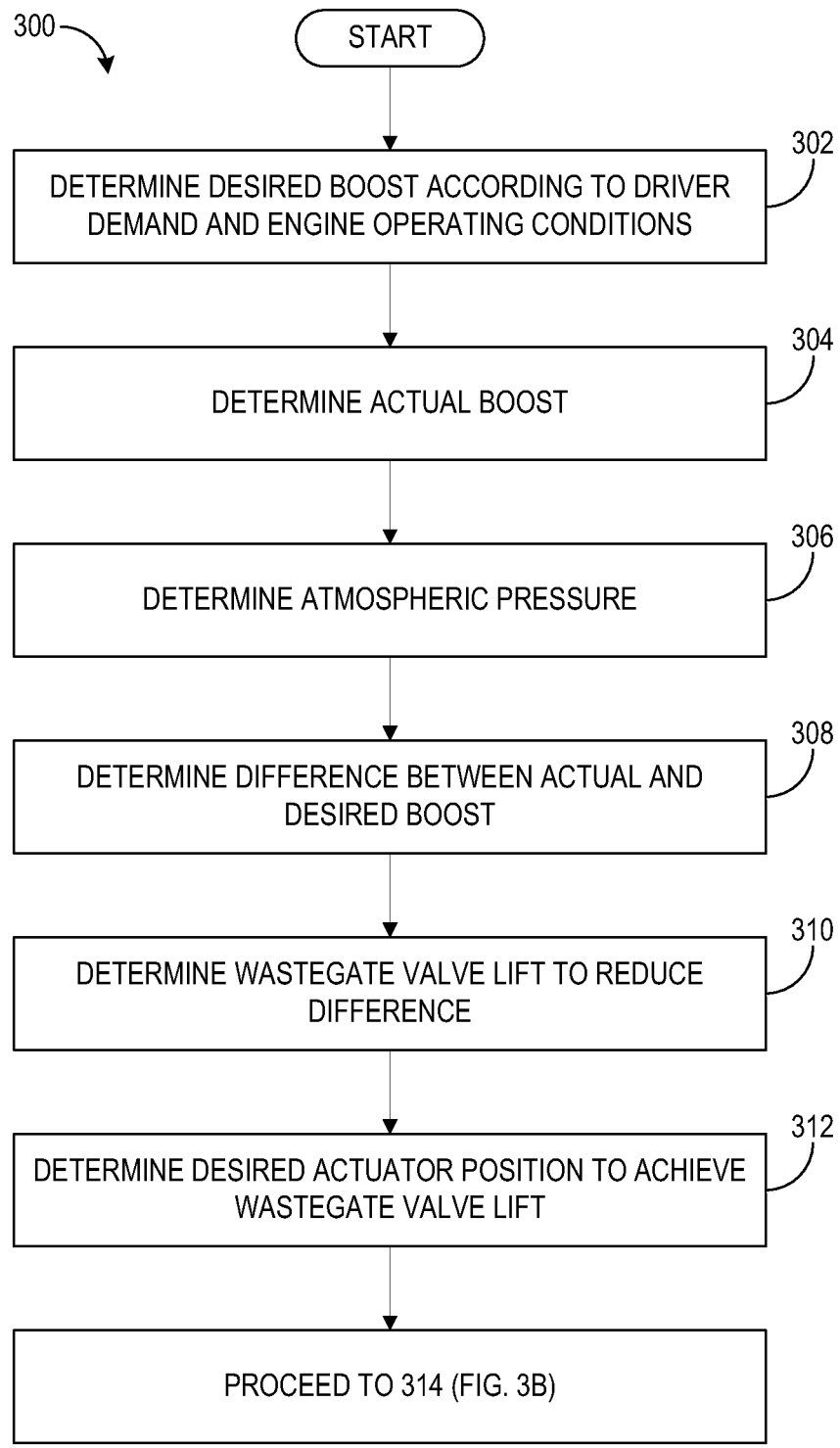
Figure 4:
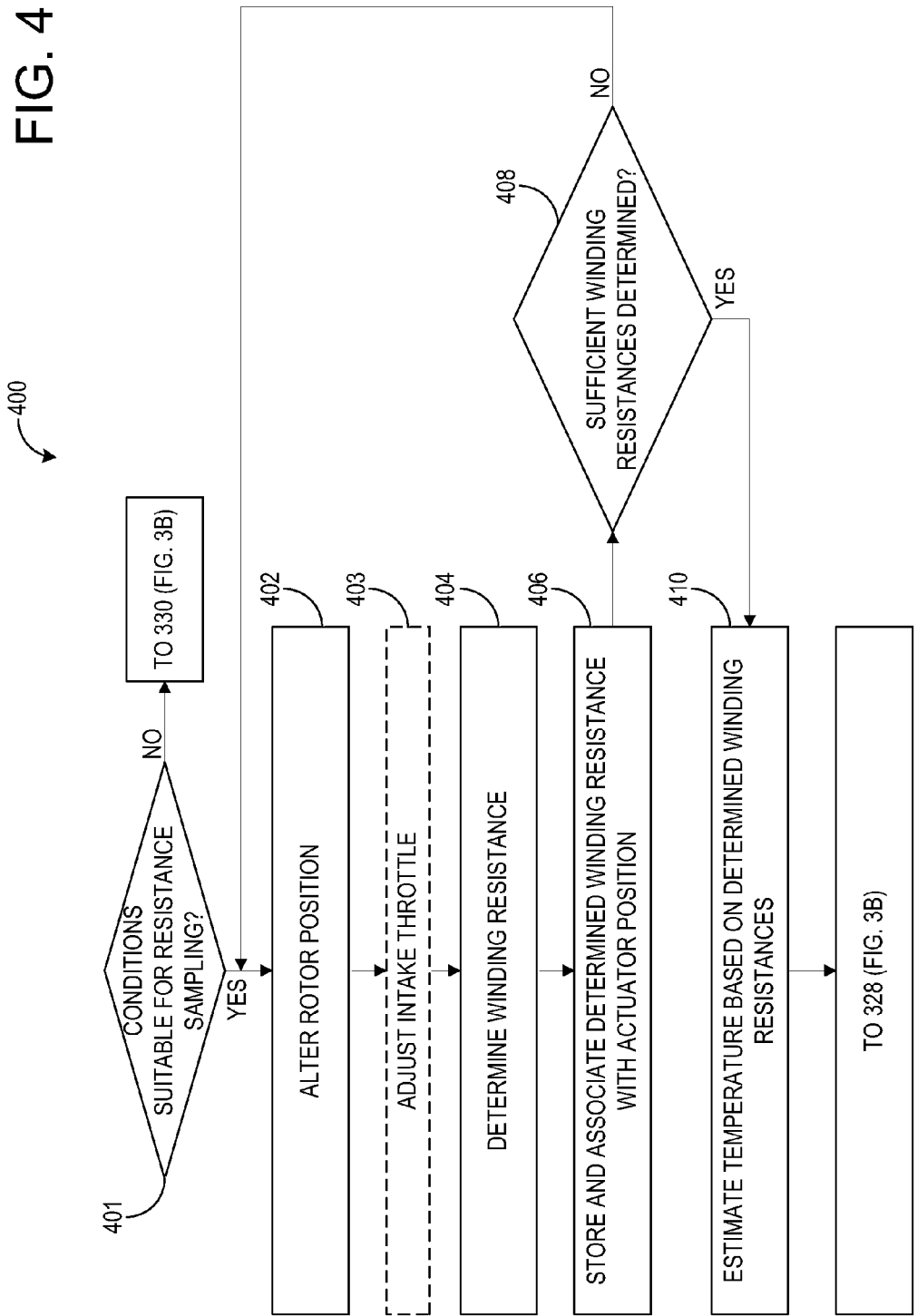
FIG. 4 shows a flowchart illustrating a method for determining the temperature of an actuator of the wastegate arrangement of FIG. 2 based on winding resistance.
Figure 5:
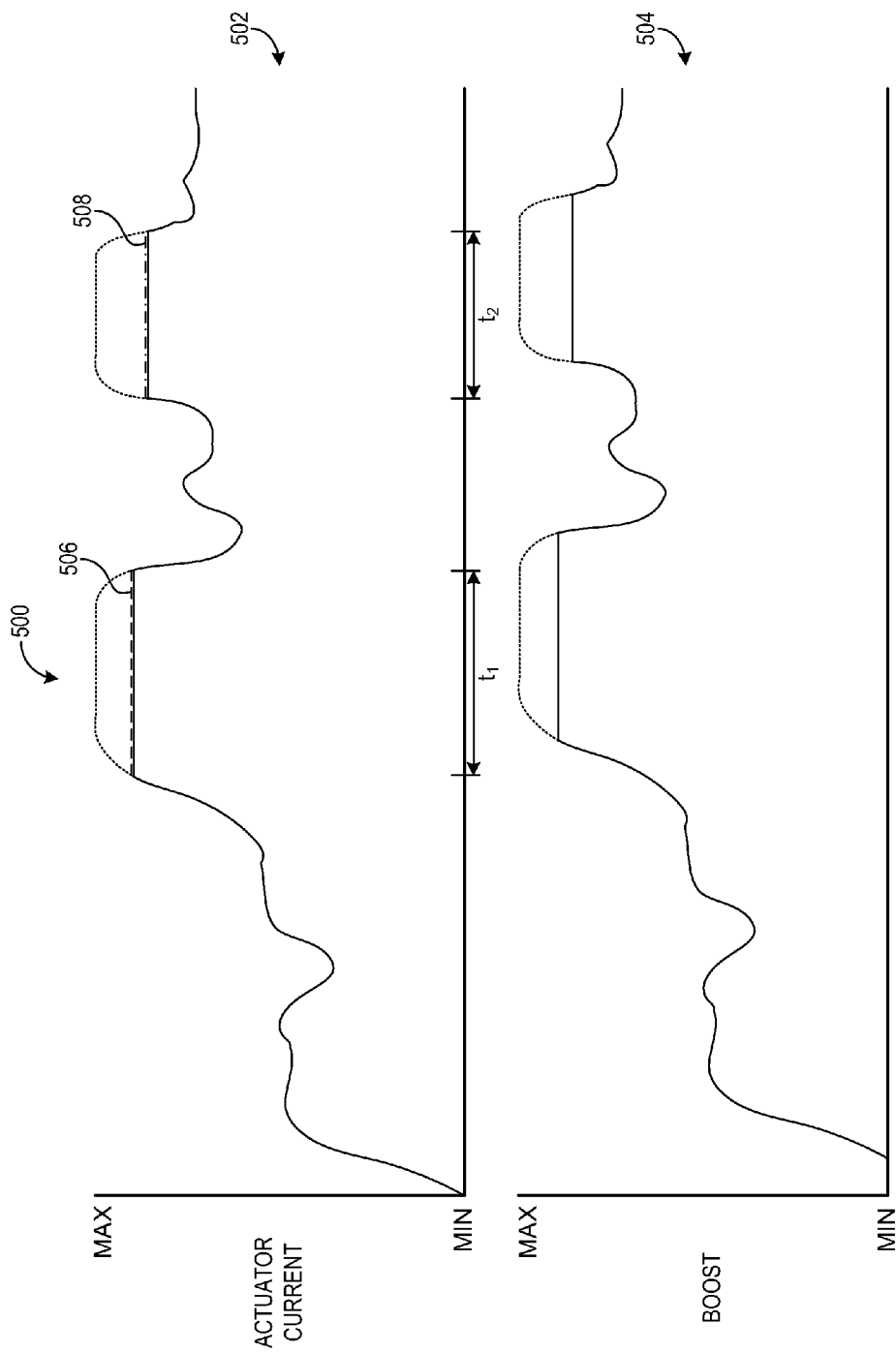
FIG. 5 shows a graph illustrating actuator current and boost limiting according to the method of FIG. 3 for an exemplary drive cycle.

Various methods for controlling current supply to a wastegate actuator based on temperature are thus provided. In one example, a method for operating a wastegate comprises limiting a boost amount in response to a current limit based on a temperature of a wastegate actuator. FIG. 1 shows a block diagram of a turbocharged engine including a wastegate, FIG. 2 shows an exemplary wastegate arrangement of the wastegate of FIG. 1, FIGS. 3A & 3B show a flowchart illustrating a method for controlling a turbocharger associated with the wastegate arrangement of FIG. 2, FIG. 4 shows a flowchart illustrating a method for determining the temperature of an actuator of the wastegate arrangement of FIG. 2 based on winding resistance, and FIG. 5 shows a graph illustrating actuator current and boost limiting according to the method of FIG. 3 for an exemplary drive cycle. The engine of FIG. 1 also includes a controller configured to carry out the methods depicted in FIGS. 3A, 3B, and 4.

FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttle 21 and 23 having throttle plates 22 and 24, respectively. In this particular example, the position of throttle plates 22 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 12 by throttle position signal TP. Intake passage 42 may further include a mass air flow sensor 120, a manifold air pressure sensor 122, and a throttle inlet pressure sensor 123 for providing respective signals MAF (mass airflow) MAP (manifold air pressure) to controller 12.

Exhaust passage 48 may receive exhaust gases from cylinders 30. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Sensor 128 may alternately be positioned downstream of turbine 62. Emission control device 78 may be a three way catalyst (TWC), NOx trap, various other emission control devices, or combinations thereof.

In some embodiments, exhaust temperature may be inferred based on engine operating conditions such as speed, load, air-fuel ratio (AFR), spark retard, etc. In other embodiments, an exhaust-side temperature sensor 79 may be positioned upstream of an inlet side of turbine 62 and downstream of an outlet side of exhaust manifold 46. Exhaust-side temperature sensor 79 may be particularly configured to sense the temperature of gasses flowing through exhaust passage 48 and relay the sensed temperature as a signal ET to controller 12. Sensor 79 may be a thermocouple, for example. More generally, exhaust temperature may be measured by sensors 79 and/or other sensors not shown located in exhaust passage 48. In other embodiments, exhaust-side temperature sensor 79 may be configured in other manners—for example, the exhaust-side temperature sensor may be configured to sense the inlet temperature of turbine 62.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48 and communicate with exhaust gasses flowing therethrough. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70. Further, a sensor 123 may be disposed in intake manifold 44 for providing a BOOST signal to controller 12.

Further, exhaust passage 48 may include wastegate 26 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Wastegate 26 may be operated with an actuator 150, which may be an electric actuator such as an electric motor, for example, though pneumatic actuators are also contemplated. Intake passage 42 may include a compressor bypass valve 27 configured to divert intake air around compressor 60. Wastegate 26 and/or compressor bypass valve 27 may be controlled by controller 12 via actuators (e.g., actuator 150) to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

FIG. 1 also generally shows a portion of a vehicle front end 160, grille shutters 162 positioned at the vehicle front end, and an engine compartment 164 at least partially housing a plurality of components including engine 10. The position (e.g., fin angle) of grille shutters 162 may be controlled by engine 12 to adjust air levels inducted into engine compartment 164, for example. The grille shutter position may be used along with other operating parameters such as vehicle speed to estimate ambient temperature. In particular, the ambient temperature of a region inside engine compartment 164 may be estimated; in one example the ambient temperature may correspond to the temperature of air surrounding and proximate wastegate actuator 150 (e.g., at a position 166), or in another example the ambient temperature may correspond to the temperature of air in the direct vicinity and proximate the wastegate actuator (e.g., at a position 168).

Turning now to FIG. 2, an exemplary wastegate arrangement 200 is shown. Wastegate 200 may be wastegate 26 in FIG. 1, for example. Wastegate 200 is operated by an actuator 202, which may be actuator 150 in FIG. 1. In this example, actuator 202 is an electric actuator such as an electric motor. In some examples, actuator 202 may particularly be a rotary actuator having an element that undergoes rotation to thereby alter the actuator position. An output shaft 201 of actuator 202 is coupled to a linkage 204 and in particular a first link 206 of the linkage. As shown, linkage 204 in the illustrated embodiment is a four-bar, though other linkages are possible such as a linear rod. Linkage 204 moves about two pivots including a first pivot 208 about which first link 206 and a second link 210 rotate, and a second pivot 212 about which a third link 214 and a fourth link 216 rotate. First, second, third, and fourth links 206, 210, 214, and 216 are commonly coupled to one another to form linkage 204 as a contiguous member. At an end opposite actuator 202, linkage 204 is coupled at fourth link 216 to a wastegate valve 218, which may be positioned at a fully open position, a fully closed position, or anywhere therebetween relative to a valve seat 220. Valve seat 220 is shown as being disposed in a portion of an exhaust passage 222, which may be exhaust passage 48 of engine 10 in FIG. 1, for example. By positioning wastegate valve 218 in this continuously variable manner, the amount of exhaust gas reaching a turbine (e.g., turbine 62 of FIG. 1) of a turbocharger may be controlled. In this way, the boost pressure delivered to an engine such as engine 10 of FIG. 1 may be controlled according to desired boost and other operating conditions. The position of wastegate valve 218 of wastegate 200 may be particularly controlled via actuation of actuator 202 and placement of its output shaft 201, movements of which may be translated to the exhaust valve via linkage 204.

As shown, wastegate 200 further includes a position sensor 224 that may be configured to measure changes in the angle of output shaft 201 to thereby estimate the location of wastegate valve 218. In some examples, a rotary encoder configured to sense rotation of a rotating component in actuator 202 may be employed, with pulses generated therefrom sent to controller 12 in FIG. 1. Position sensor 224 may be adapted for embodiments in which a linear rod linkage is used in lieu of the four-bar configuration shown in FIG. 2, however. In any case, a measurement by position sensor 224 may be used to determine the position of wastegate valve 218, particularly the distance from the top surface of valve seat 220 to the bottom surface of wastegate valve 218. In other embodiments, however, the position of wastegate valve may be determined based on a soft model using one or more of the signals (e.g., BOOST) described above with reference to FIG. 1 and sent to controller 12.

It will be appreciated that wastegate 200 and various components thereof may be modified without departing from the scope of this disclosure. For example, a current sensor and/or a force sensor may be included with actuator 202, in lieu of or in addition to position sensor 224. Current sensing may be facilitated via a sensor or probe, or in other examples may be calculated based on Ohm's law (or other relation) as the ratio of actuator voltage (e.g., terminal voltage) and actuator resistance (e.g., winding resistance), if these two quantities are known or can be measured or inferred. Further, as described above, other types of linkages may be provided to couple actuator 202 with wastegate valve 218, including but not limited to a linear rod. Moreover, a bias (not shown) may be coupled to wastegate valve 218 to position the valve in a default position when the valve is not actuated by actuator 202.

At operating temperatures above a threshold, actuator 202 may become degraded. As such, determination of the operating temperature of actuator 202 may be sought, with various actions taken if the operating temperature exceeds a lower threshold. A variety of factors may contribute to the operating temperature of actuator 202, referred to herein as the "actuator temperature". "Actuator temperature", as used herein, particularly refers to the temperature of the windings of actuator 202, and as described in further detail below may be inferred based on a determination of the temperature of the ambient environment surrounding the actuator, or in other embodiments, direct estimation of the winding temperature based on a determination of the resistance of the windings. Because ambient temperatures in the environment (e.g., wastegate assembly 200) surrounding actuator 202 may significantly affect the actuator temperature, as such ambient environmental temperatures may be affected by the flow of proximate exhaust gas such as exhaust gas flowing through exhaust passage 222, wastegate assembly 200 may include a temperature sensor 226 configured to sense the temperature of the ambient environment surrounding actuator 202, which in some examples may be used to determine the actuator temperature. In other embodiments, the environmental temperature may be estimated based on various engine and vehicle operating conditions. For example, the operating conditions may include ambient temperature, engine speed, engine load, vehicle speed and a grille shutter position (e.g., fin angle of grille shutter 162 of FIG. 1). As described above, the environmental temperature may correspond to a region generally proximate wastegate actuator 202 (e.g., corresponding to position 166 of FIG. 1), or a region proximate and in a direct vicinity to the actuator (e.g., corresponding to position 168 of FIG. 1).

For embodiments in which the environmental temperature surrounding actuator 202 is used to determine the actuator temperature, a maximum current that can be supplied to the actuator may be determined for a given environmental temperature. For example, the following relation may yield the temperature of windings of actuator 202 as a function of time: $T(t)=I^2*R*K_T*(1-e^{-t/\tau})+T_E$, where T is the actuator winding temperature (e.g., used in some examples as the actuator temperature), t is time, I is winding current, R is winding resistance, $K_T$ is thermal resistance of the windings (e.g., in units of ° C./W), $\tau$ is a thermal time constant, and $T_E$ is the environmental temperature (e.g., inferred as described above or based on output from temperature sensor 226). In the limit that time t approaches infinity, however, the relation assumes the following form: $T=I^2*R*K_T+T_E$. The maximum current that may be supplied to the actuator indefinitely may thus be determined based on this relation according to the following rearranged relation: $I_{MAX}=\text{sqrt}((T_{MAX}-T_E)/(R*K_T))$, where $I_{MAX}$ is the maximum continuous current that may be supplied to the actuator indefinitely (referred to herein as the "maximum allowable current"), and $T_{MAX}$ is the maximum allowable winding temperature—i.e., the maximum temperature that the windings of actuator 202 may assume before undergoing degradation. In some examples, the maximum allowable winding temperature may be determined offline based on known properties of actuator 202.

In other examples, the maximum allowable current may be determined based on online determination of the winding temperature, alternatively or additionally to the environmental temperature. For embodiments in which winding temperature is determined online and used in lieu of environmental temperature, the maximum allowable current may be determined based on the difference between the instant winding temperature and the maximum allowable winding temperature. In some examples, changes to the current supplied to actuator 202 may be proportional to this difference.

In some embodiments, the instant winding temperature of actuator 202 may be determined based on the winding resistance of the actuator, which in turn may be determined based on an average of multiple sampled winding resistances of the actuator rotor throughout a rotational range of the rotor. Sampling and averaging winding resistances at multiple rotor angles throughout a rotational range (e.g., a full 360° turn, a full half 180° turn, etc.) in this way may increase the accuracy of winding resistance estimation and actuator temperature estimation, as winding resistance may be dependent on rotor position in an electric motor. A given winding resistance may be determined in various suitable manners, including but not limited to measuring the voltage and current supplied to actuator 202. Current sensing may be facilitated via the current sensor or probe described above, for example. An averaged winding resistance may then be related to a winding temperature based on known material properties of the windings, for example via a lookup table. A method 400 shown in FIG. 4 and described below may be employed to obtain winding resistances during accommodating operational windows.

FIGS. 3A and 3B show a flowchart illustrating a method 300 for controlling a turbocharger associated with wastegate arrangement 200 of FIG. 2. Method 300 may be executed by an engine controller (e.g., controller 12 of FIG. 1) and utilized to control a turbocharger via a wastegate (e.g., wastegate 200 of FIG. 2). Wastegate actuator 202 of FIG. 2 in particular may be used to actuate the wastegate. In one example, a method of controlling the turbocharger via the wastegate may comprise determining a desired boost pressure and an actual boost pressure. The wastegate may be adjusted according to a difference between the desired boost pressure and the actual boost pressure.

At 302, the method includes determining a desired boost according to driver demand and engine operating conditions. The conditions assessed may be directly measured with sensors, such as sensors 112, 118, 120, 122, 123, and 134 for example, and/or the conditions may be estimated from other engine operating conditions. The assessed conditions may include engine coolant temperature, engine oil temperature, mass airflow (MAF), manifold pressure (MAP), boost (for example, BOOST pressure from sensor 123), engine speed, idle speed, barometric pressure, a driver-demanded torque (for example, from a pedal position sensor 134), air temperature, vehicle speed, etc.

Next, at 304 of the method, an actual boost pressure is determined. The actual boost may be directly measured from a sensor, such as sensor 123. The measurement may be sent to controller 12 via the BOOST pressure signal and stored in a computer-readable storage medium (e.g., ROM 106, RAM 108, and/or KAM 110 of controller 12 in FIG. 1). In an alternative embodiment, the actual boost pressure may be estimated based on other operating parameters, such as based on MAP and RPM, for example.

Next, at 306 of the method, atmospheric pressure is determined. For example, atmospheric pressure may be measured from the MAP sensor at engine start-up, and/or estimated based on operating conditions of the engine, including MAF, MAP, throttle position, etc. The measurement may be sent to the engine controller and stored in the computer readable storage medium. In an alternative embodiment, the atmospheric pressure may be estimated based on other operating parameters.

Next, at 308 of the method, a difference between the actual and desired boost is determined. The engine controller may determine the difference, for example. In some examples, the difference may be determined by subtracting the desired boost from the actual boost.

Next, at 310 of the method, a wastegate valve lift is determined in order to reduce the difference between the actual and desired boost determined at 308. In some examples, the difference between the actual and desired boost, in addition to the current wastegate valve lift (e.g., sensed via position sensor 224), is fed to a suitable control mechanism configured to determine a wastegate valve lift in order to reduce this difference. For example, the wastegate valve lift may be used as an input to wastegate dynamics. In some wastegate actuators, the wastegate valve lift may be mapped to a wastegate duty cycle, where the duty cycle signal is generated by the controller and sent to the wastegate actuator. Mapping to a wastegate duty cycle may include using lookup tables or calculating the wastegate duty cycle. In some other actuators, the wastegate controller determines the duty cycle based on the difference between the desired and actual wastegate positions. A wastegate control (WGC) signal may include pulse width modulation via the wastegate duty cycle to adjust the wastegate. The wastegate valve lift may be achieved by feed-forward, feedback, and/or other control algorithms, for example.

A compensation term may account for delays of the wastegate actuator. Additionally, the compensation term may further include adjustments based on movement of twin independent cams, which can affect boost pressure. For example, as the intake cam is moved in a way that would increase boost pressure relative to atmospheric pressure, the magnitude of the compensation term may be decreased. Likewise, as the intake cam is moved in a way that would decrease boost pressure relative to atmospheric pressure, the magnitude of the compensation term may be increased.

Next, at 312 of the method, a desired actuator position is determined to achieve the wastegate valve lift determined at 310. The desired actuator position may be fed as an input to various suitable control mechanisms including those described above. In some embodiments, a desired actuator orientation may be alternatively determined, such as the rotational orientation of a rotating component in the actuator.

Next, at 314 of the method, a desired actuator current is determined to achieve the desired wastegate valve lift. The desired actuator current may be determined based on the difference between the instant actuator position and the desired actuator position, as well as exhaust forces acting against the wastegate valve.

Next, at 316 of the method, the temperature of the actuator is determined. Determination of the actuator temperature may include, at 318, determining the environmental temperature surrounding the actuator. As described above, the environmental temperature surrounding the actuator may be determined based on output from a sensor configured to measure such temperature—for example, output from temperature sensor 226 of FIG. 2 may be one input used to determine the environmental temperature. Other mechanisms may be employed to determine the environmental temperature of the actuator, however. In some examples, the environmental temperature may be estimated based on one or more operating parameters (e.g., ambient temperature, engine speed, engine load, vehicle speed, grille shutter position, etc.). The environmental temperature may correspond to a region generally proximate the actuator (e.g., at position 166 of FIG. 1), or a region proximate and in a direct vicinity to the actuator (e.g., at position 168 of FIG. 1).

Next, at 320 of the method, the maximum allowable current that may be supplied to the actuator is determined based on the actuator temperature determined at 316 and known properties of the actuator. In particular, the following relation described above may be used to determine the maximum allowable current: $I_{MAX} = \sqrt{(T_{MAX} - T_E)/(R \cdot K_T)}$, where $T_{MAX}$ may be a fixed value for a given actuator. In some examples, the maximum allowable actuator temperature $T_{MAX}$ may be set to a relatively reduced value to provide a cushion against actuator degradation. In some embodiments, if the environmental temperature cannot be determined, a worst case temperature (e.g., maximum underhood temperature) may be used as $T_E$ in the above relation.

Next, at 322 of the method, it is determined whether the desired actuator current determined at 314 exceeds the maximum allowable actuator current. If the desired actuator current exceeds the maximum allowable current (YES), the method proceeds to 326. If the desired actuator current does not exceed the maximum allowable current (NO), the method proceeds to 334.

At 324 of the method, boost is limited to avoid degraded actuator operation. Boost limiting may include, at 326, placing the actuator at a best possible actuator position by supplying no more than the maximum allowable current to the actuator, if current has been continuously applied to the actuator for more than a threshold duration. Continuous application of current to the actuator may occur during conditions in which maximum boost is requested, for example. The threshold duration may be set to various suitable values to ensure actuator protection (e.g., one second) without preventing actuator operation that does not risk degradation. Placing the actuator at the best possible position in turn positions the wastegate valve at the best possible lift. For example, a desired boost level (e.g., maximum boost) may be undershot by increasing the wastegate valve lift relative to the lift that would be controlled to achieve the desired boost level (e.g. zero lift/fully closed position). However, the amount by which the valve lift is increased, the amount by which the current supplied to the actuator to achieve the reduction is reduced, and correspondingly the amount the desired boost is undershot, are minimums to avoid degradation of the actuator. In other words, the desired boost is undershot by a minimum value, which may minimize, or in some cases render imperceptible, the adverse impact on vehicle performance perceived by a vehicle operator. In some examples, the amount by which the valve lift is increased and the current reduced may be determined in proportion to the amount by which the desired actuator current exceeds the maximum allowable current.

Next, at 326 of the method, the winding temperature of the actuator is optionally determined. Steps 326 and 328 of the method generally represent an approach to actuator protection in which the winding temperature is used to limit current and particularly the amount by which current is limited.

Turning now to FIG. 4, a flowchart illustrating a method 400 for determining the temperature of wastegate actuator 202 of FIG. 2 based on winding resistance is shown. Method 400 may be executed by engine controller 12 of FIG. 1, for example.

At 401 of the method, it is determined whether operating conditions are suitable for sampling winding resistances of the wastegate actuator. Suitable conditions may include the wastegate valve approaching the fully closed position (e.g., approaching valve seat 220 of FIG. 2). It will be noted that scenarios in which the valve is not approaching the fully closed position may include those in which the valve is moving away from the fully closed position (e.g., toward the fully open position), or those in which the valve is moving toward the fully closed position but will not reach the fully closed position (e.g., a desired wastegate valve lift at which the valve is to be placed does not correspond to the fully closed position).

In some examples, the suitable conditions may also stipulate the speed of approach to the fully closed position be less than a threshold. Valve speed below the threshold may afford an opportunity to determine winding resistance at multiple rotor positions according to method 400, as, in some examples, the actuator resistance may correspond to the following relation: $R=(1/I)(V-L*(dI/dt)+K*s)$, where R is the winding resistance, I is the electrical current supplied to the actuator, V is the actuator voltage, L is the winding inductance, t is time, K is a constant, and s is the valve speed. Thus, at valve speeds below the threshold, the final term $(K*s)$ of the aforementioned relation may become negligible. Under such conditions, the electrical current may be close to steady state, and thus (dI/dt) may be become negligible, making the relation $R=V/I$. Accordingly, the winding resistance may be determined if V and I can be measured or determined. In some embodiments, this simplification of winding resistance estimation may be employed in scenarios where the valve is not approaching the fully closed position. In other examples, however, winding resistance may be determined at valve speeds above the threshold by estimating the $(L*(dI/dt))$ and $(K*s)$ if constant K and inductance L are known.

The suitable conditions may further include the wastegate valve position corresponding to steady state—e.g., the valve position being constant. The valve position may be at the fully closed position, fully open position, or at any partial lift therebetween.

If, at 401 of the method, it is determined that the operating conditions are suitable for winding resistance sampling (YES), the method proceeds to 402. If it is determined that the operating conditions are not suitable for winding resistance sampling (NO), the method proceeds to 330 of method 300 of FIG. 3.

At 402 of the method, the rotor position (e.g., angular orientation) of the wastegate actuator is altered. In some examples, the engine controller may issue an altered actuator position to the wastegate actuator to thereby alter the rotor position. As described in further detail below, the rotor position may be adjusted in various suitable amounts (e.g., angles).

Next, at 403 of the method, an intake throttle may be optionally adjusted to compensate variation in boost levels caused by deviation from the desired wastegate position to the altered wastegate position. Intake throttle 21 and/or 23 of FIG. 1 may be varied, for example. In some scenarios, intake throttle adjustment may include increasing opening of the throttle if the altered wastegate position increases the opening of the wastegate valve, and vice versa.

Next, at 404 of the method, the winding resistance of the wastegate actuator is determined. As described above, in some examples the winding resistance may be determined by measuring the voltage and current supplied to the actuator and dividing the voltage by the current. In other scenarios in which the speed of the wastegate valve is above a threshold, the winding resistance may be determined according to the relation described above $(R=(1/I)(V-L*(dI/dt)+K*s))$.

Next, at 406 of the method, the determined winding resistance is stored and associated with the instant actuator position. The winding resistance and actuator position may be stored in various suitable data structures, including but not limited to a lookup table.

Next, at 408 of the method, it is determined whether a sufficient number of winding resistances have been determined. Here, the data structure in which the determined winding resistances are stored may be accessed to determine the number of winding resistances determined thus far. Various suitable numbers may be selected as a minimum number of winding resistances to ensure adequate characterization of the actuator winding resistance. Alternatively or additionally, a minimum angular range through which winding resistances are to be determined may be specified. In some examples, the data structure may be accessed to determine the rotational range of the rotor spanned by the determined winding resistances. In some embodiments, winding resistances may be collected throughout the entire rotational range of the rotor (e.g., a full turn spanning 360°, a half-turn spanning 180°). Thus, the rotor position may be altered at 402 a number of times, and, as described above, by an appropriate step size (e.g., angle). The step size and number of samples may be selected according to operating conditions and an expected duration for which conditions suitable to winding resistance may persist, for example. Accordingly, if it is determined that the number of determined winding resistances is not sufficient (NO), the method returns to 402. If it is determined that the number of winding resistances is sufficient (YES), the method proceeds to 410.

At 410 of the method, the temperature of the actuator is estimated based on the determined winding resistances. Temperature estimation may include averaging the determined winding resistances in a suitable manner to form an averaged winding resistance. The averaged winding resistance may then be used to determine a winding temperature based on known properties of the winding material(s). A lookup table having a plurality of winding resistances each associated with a winding temperature may be accessed, for example.

Returning to FIG. 3B, at 328 of the method, having successfully determined the winding temperature of the actuator at 326, the current supplied to the actuator is optionally limited based on a difference between the winding temperature determined at 326 and the maximum allowable winding temperature. In some examples, the extent to which current is limited may be proportional to the difference between the winding temperature and the maximum allowable winding temperature.

Next, at 330 of the method, the fuel supplied to an engine (e.g., engine 10 of FIG. 1) associated with the wastegate may be limited. The extent to which fuel supply is limited may be in proportion to the extent to which boost is limited, and particularly, the reduction in air supply to the engine. In this way, optimal (e.g., stoichiometric) engine operation may be maintained.

Next, at 332 of the method, boost limiting at 324 or 328 may be reported. Reporting the limited boost may include warning a vehicle operator via a dashboard indicator, for example, and may further include recording the event in the engine controller. Following 332, the method ends.

At 334, if it was determined at 322 that the desired actuator current does not exceed the maximum allowable current, the desired current is applied to the actuator to achieve the desired actuator position. A suitable voltage-to-current conversion mechanism may convert a voltage generated by the actuator controller to generate the current.

Next, at 336 of the method, it is determined whether the actuator position is at the desired actuator position. Here, the sensed actuator position may be compared to the desired actuator position. In some embodiments, differences between the actuator position and the desired actuator position below a threshold may be ignored. If the actuator position is not at the desired actuator position (NO), the method returns to 314. If the actuator position is at the desired actuator position (YES), the method proceeds to 338.

At 338 of the method, the current applied to the actuator is adjusted to maintain the desired valve lift and control the actuator position. The desired valve lift may be maintained via feedback and/or feed-forward control algorithms. For example, valve lift may be controlled via an inner control loop. Thus, the applied current is adjusted when the corrected actuator position reaches a position corresponding to a desired wastegate valve position. Following 338, the method ends.

Some conditions may prompt use of one of the environmental temperature and the winding temperature and not the other to determine the maximum allowable current. For example, the winding temperature, and not the environmental temperature, may be used if the environmental temperature has remained substantially constant (e.g., changed 5% or less) for at least a threshold duration but at least a threshold amount of current has been applied to the actuator throughout this duration. In this case, while the environmental temperature may remain approximately unchanged, significant application of current to the actuator may affect its temperature which sole measurement of the environmental temperature may not indicate. Measurement of the winding temperature, however, may reflect this change. In other scenarios, the environmental temperature, and not the winding temperature, may be used if operating conditions are not suitable to determine the winding temperature, as determined at 401 of method 400. Similarly, winding temperature may be eschewed if a sufficient number of winding resistance samples were not obtained as determined at 408 of method 400.

Thus, as shown and described, methods 300 and 400 may be employed to reduce the potential for degraded wastegate actuator operation and degraded boost control due to excessive actuator temperature, while minimizing the extent of boost reduction and avoiding degraded operation if the actuator temperature exceeds a maximum allowable temperature. Further, it will be appreciated that methods 300 and 400 may be employed iteratively throughout wastegate operation.

In another representation, a method for operating a wastegate (e.g., wastegate 200 of FIG. 2) may comprise estimating a motor current to provide a desired level of boost, and limiting a boost amount in response to a current limit based on a temperature of a wastegate actuator (e.g., actuator 202 of FIG. 2). The current limit may be based on ambient temperature, and the method may further comprise limiting a fuel amount supplied to an engine (e.g., engine 10 of FIG. 1) in response to the limited boost amount.

Turning now to FIG. 5, a graph 500 illustrating actuator current and boost limiting according to method 300 of FIG. 3 for an exemplary drive cycle is shown. Graph 500 includes a plot 502 of current supplied to a wastegate actuator (e.g., actuator 202 of FIG. 2) that spans a range of currents from a minimum current (e.g., zero current supplied such as during conditions in which boost is not desired) to a maximum current (e.g., during conditions in which maximum boost is desired). Graph 500 also shows a plot 504 of boost resulting from variation in placement of a wastegate valve (e.g., valve 218 of FIG. 2) actuated by the wastegate actuator according to the current supplied thereto.

As shown, in a first duration $t_1$ maximum boost is requested, in addition to boost levels close to maximum preceding and following request of maximum boost. During $t_1$, a first maximum allowable current 506 that may be supplied to the actuator is determined, represented by dashed lines. The first maximum allowable current 506 is determined based on a maximum allowable actuator temperature in the manners described above. The desired current levels to achieve the requested boost levels throughout duration $t_1$, however, exceed the first maximum allowable current 506. As such, the current supplied to the actuator is limited to the first maximum allowable current 506 (the supplied current being shown as slightly below the first maximum allowable current for clarity in FIG. 5). Current levels that exceed the first maximum allowable current 506, and that would otherwise be supplied to the actuator, are shown in finely dashed lines in FIG. 5. A corresponding reduction in boost is also shown in plot 504, as well as the boost that would otherwise be generated in finely dashed lines without the reduction in supplied current.

Similarly, in a second duration $t_2$, maximum boost, and similarly high boost levels, is requested once more. A second maximum allowable current 508 is determined in the manners described above. However, the second maximum allowable current 508 is less than the first maximum allowable current 506, for example due to an increase in environmental temperatures surrounding the wastegate and/or the greater net current that has been supplied to the actuator during $t_2$ relative to $t_1$. As such, the current supplied to the actuator is limited to the second maximum allowable current 506 (the supplied current being shown as slightly below the second maximum allowable current for clarity in FIG. 5). Current levels that exceed the second maximum allowable current 508, and that would otherwise be supplied to the actuator, are shown in finely dashed lines in FIG. 5. A corresponding reduction in boost is also shown in plot 504, as well as the boost that would otherwise be generated in finely dashed lines without the reduction in supplied current. As described above, various actions may be taken for durations in which boost is limited due to current limiting, such as limiting the fuel supplied to an associated engine.

It will be appreciated that graph 500 is provided for the sake of understanding and is not intended to be limiting in any way. For example, the shapes of plots 502 and 504, the temporal lag therebetween, the values of the first and second maximum allowable currents 506 and 508, and the extent to which supplied current and boost are limited are merely illustrative and may be exaggerated relative to actual wastegate/vehicle operation.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a wastegate, comprising:
   determining an electrical current limit of a wastegate actuator and limiting a boost amount in response to the electrical current limit and based on environmental conditions via a controller;
   wherein the limiting the boost amount includes placing the wastegate actuator at a position by supplying at most electrical current equal to the electrical current limit to the wastegate actuator; and
   wherein the electrical current limit is determined based on a temperature of the wastegate actuator, the temperature of the wastegate actuator determined based on the environmental conditions including an environmental temperature proximate the wastegate actuator.

2. The method of claim 1, wherein the environmental temperature is estimated based on a plurality of engine operating conditions, vehicle speed, and a grill shutter position.

3. The method of claim 1, further comprising limiting a fuel amount supplied to an engine proportional to an extent that the boost amount is limited.

4. A method for operating a wastegate via a wastegate actuator, comprising:
   varying electrical current supplied to the actuator responsive to desired boost and actual boost, determining a maximum allowable electrical current based on a temperature of the actuator, and reducing an instant electrical current supplied to the actuator responsive to the instant electrical current exceeding the maximum allowable electrical current via a controller;
   wherein the temperature of the actuator is determined based on a temperature of an environment surrounding the actuator; and
   wherein the electrical current supplied to the actuator controls a position of the actuator.

5. The method of claim 4, wherein reducing the instant electrical current includes reducing the instant electrical current to the maximum allowable electrical current.

6. The method of claim 4, wherein the instant electrical current is continuously supplied to the actuator for at least a threshold duration.

7. The method of claim 4, wherein the temperature of the actuator is determined based on a winding temperature of the actuator.

8. The method of claim 7, wherein the winding temperature is based on two or more winding resistance measurements of the actuator sampled throughout at least a full half-turn of a rotor of the actuator.

9. The method of claim 4, further comprising limiting boost supplied to an engine by reducing the instant electrical current supplied to the actuator.

10. The method of claim 9, further comprising reporting limiting of the boost via setting a diagnostic code.

11. The method of claim 4, further comprising placing and maintaining the actuator at a possible position by supplying no more than the maximum allowable electrical current to the actuator.

12. The method of claim 4, further comprising limiting fuel supplied to an engine.

13. A method for operating an electric wastegate actuator, comprising:

determining a maximum allowable winding current based on actuator temperature, determining that a desired actuator current based on desired boost and actual boost exceeds the maximum allowable winding current, and supplying a current to the actuator less than the desired actuator current via a controller;

the actuator temperature determined based on an environmental temperature surrounding the actuator; and the current supplied to the actuator controlling a position of the actuator.

14. The method of claim 13, wherein supplying the current less than the desired actuator current to the actuator includes supplying the maximum allowable winding current.

15. The method of claim 13, wherein the actuator temperature is further determined based on winding temperature of the actuator.

16. The method of claim 15, wherein the winding temperature is determined based on multiple winding resistance measurements sampled throughout a minimum rotational range of a rotor of the actuator during select boost conditions.

* * * * *